United States Patent [19]

Leachman, Jr. et al.

[11] Patent Number: 4,487,548

[45] Date of Patent: Dec. 11, 1984

[54] CENTRIFUGAL MAIN FUEL PUMP HAVING STARTING ELEMENT

[75] Inventors: Frank A. Leachman, Jr., Bristol; Godwin L. Noell, Winsted, both of Conn.

[73] Assignee: Chandler Evans Inc., West Hartford, Conn.

[21] Appl. No.: 495,987

[22] Filed: May 19, 1983

[51] Int. Cl.³ .............................................. F01D 19/00
[52] U.S. Cl. ...................................... 415/28; 415/26; 415/144
[58] Field of Search ....................... 415/20, 26, 27, 28, 415/38, 40, 49, 144, 145, 62, 115, 210, 211, 17, 19, 83, 50

[56] References Cited

U.S. PATENT DOCUMENTS

| | | | |
|---|---|---|---|
| 2,658,338 | 11/1953 | Leduc | 415/211 |
| 3,576,375 | 4/1971 | Jackson | 415/18 |
| 3,851,998 | 12/1974 | Downing | 417/199 A |
| 3,953,147 | 4/1976 | Aspinwall | 415/211 |
| 4,194,893 | 3/1980 | Woodhouse et al. | 137/202 |

FOREIGN PATENT DOCUMENTS

| | | | |
|---|---|---|---|
| 181999 | 11/1982 | Japan | 415/211 |
| 551887 | 11/1956 | Switzerland | 415/145 |

*Primary Examiner*—Robert E. Garrett
*Assistant Examiner*—Timothy E. Nauman
*Attorney, Agent, or Firm*—Radford W. Luther; Richard A. Dornon

[57] ABSTRACT

A centrifugal main fuel pump (10′) for a gas turbine engine has a housing (12′) in which a centrifugal impeller (16′) is mounted for rotation. The centrifugal impeller includes a disc (24′) which carries starting flow impeller elements (34) which are positioned in a radially outer location on the disc and also carries main flow impeller elements (26′) positioned in a radially inner location on the disc. The starting flow impeller elements discharge to a starting flow collector (38) and diffuser (44) and the main flow impeller elements discharge to a separate collector (30′) and diffuser (32′). The starting flow impeller elements produce adequate fuel flow at the pressure necessary for engine lightoff while the main flow impeller elements are adapted to supply engine fuel flow demand in the normal range of operation. A check valve (46) prevents starting flow from returning to the centrifugal impeller. The check valve opens to allow the main flow impeller elements to supply fuel when their discharge pressure exceeds that of the starting flow impeller elements. The addition of a starting element to the impeller results in minimal additional parasitic power loss.

3 Claims, 7 Drawing Figures

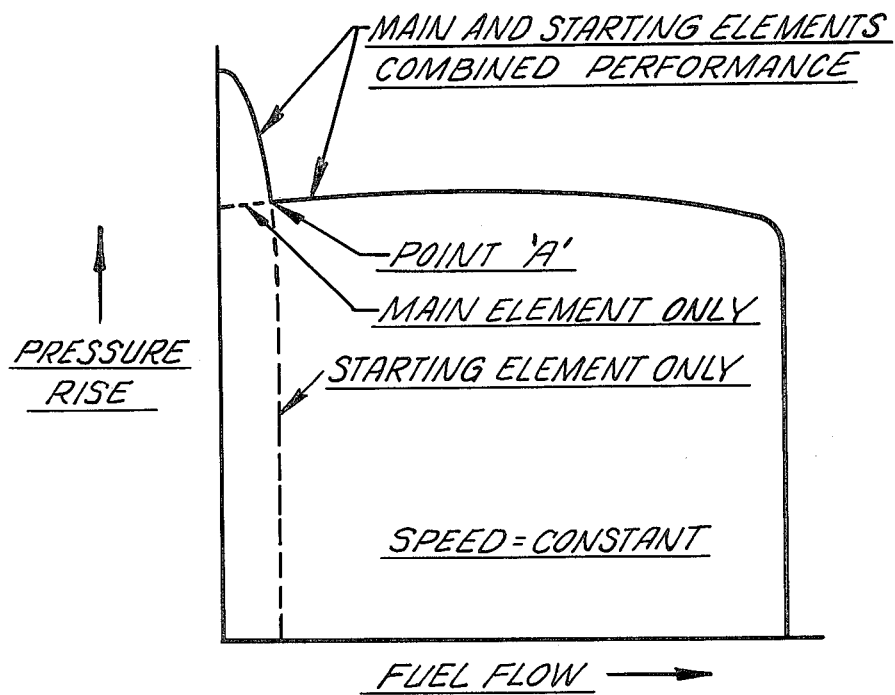

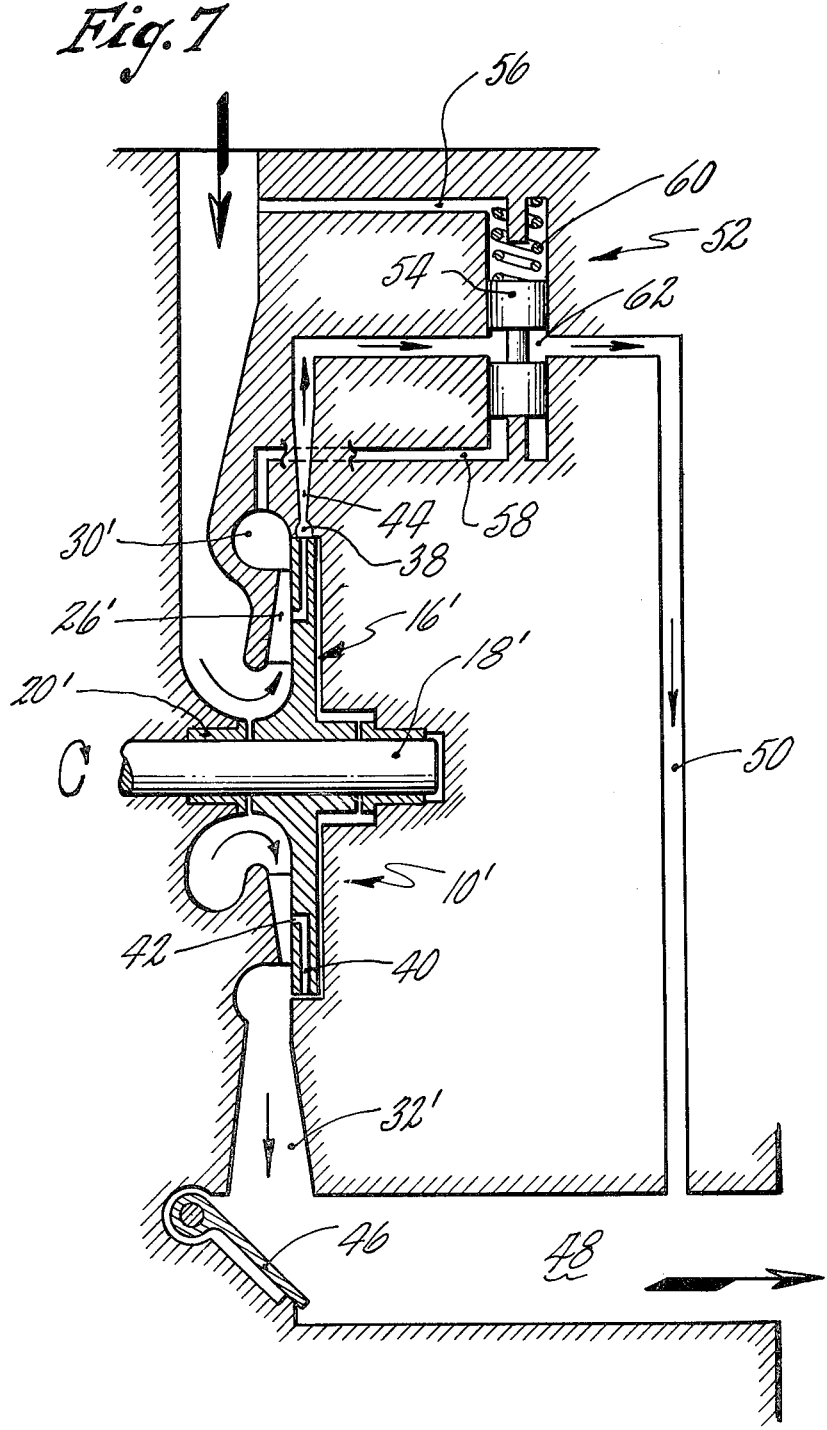

CENTRIFUGAL MAIN FUEL PUMP HAVING STARTING ELEMENT

TECHNICAL FIELD

This invention relates to centrifugal fluid pumps for pumping fuel to gas turbine engines.

BACKGROUND ART

Typically, gas turbine engine fuel controls utilize positive displacement pumps to supply fuel at the necessary high pressures. However, positive displacement pumps require close operating clearances and contain parts with highly stressed metal-to-metal contacts which wear rapidly in low lubricity fuel. In addition, the performance of positive displacement pumps may be adversely affected by the presence of contaminants.

While high speed centrifugal pumps are relatively insensitive to contaminants and are capable of generating the fuel pressures required for engine operation in their normal speed range, such pumps will not generate sufficient fuel pressure at engine light-off or cranking speed (which may typically be 10% to 20% of maximum engine speed). In order to overcome the aforementioned drawback, centrifugal pumps have been combined with positive displacement pumps to form pumps capable of extending the lower range of operation. An example of such a combination pump is shown in U.S. Pat. No. 3,851,998. The major undesirable characteristic of a combination pump is that it must be relatively complex.

U.S. Pat. No. 3,576,375 offers a solution to the previously discussed problems by providing a fuel pump with two impeller elements, one for starting and one for normal operation. While the latter described arrangement may successfully pump fuel at the necessary pressures, it requires that the two impeller elements be mounted in separate chambers and interconnected by means such as a common drive shaft. Moreover, the chamber in which the starting impeller is located must be drained of fluid to eliminate fluid resistance during normal operation or alternatively, some form of clutch mechanism must be employed.

DISCLOSURE OF THE INVENTION

The invention solves the aforementioned problems by combining main flow impeller elements and starting flow impeller elements into a unitary centrifugal impeller. A fuel pump of the invention has separate collectors to receive flow from the respective impeller elements and appropriate valving to control the output flow of the pump.

Accordingly, it is a primary object of the invention to provide a fuel pump which has a unitary centrifugal impeller which combines main flow and starting flow impeller elements.

This and other objects and advantages of the invention will become more readily apparent from the following detailed description, when taken in conjunction with the accompanying drawings, in which:

BRIEF DESCRIPTION OF DRAWINGS

FIG. 6 is a graph of performance of a pumping system as shown in FIG. 5.

FIG. 7 is a schematic view of a modification to the pumping system of FIG. 5.

BEST MODE OF CARRYING OUT THE INVENTION

Figure 1:
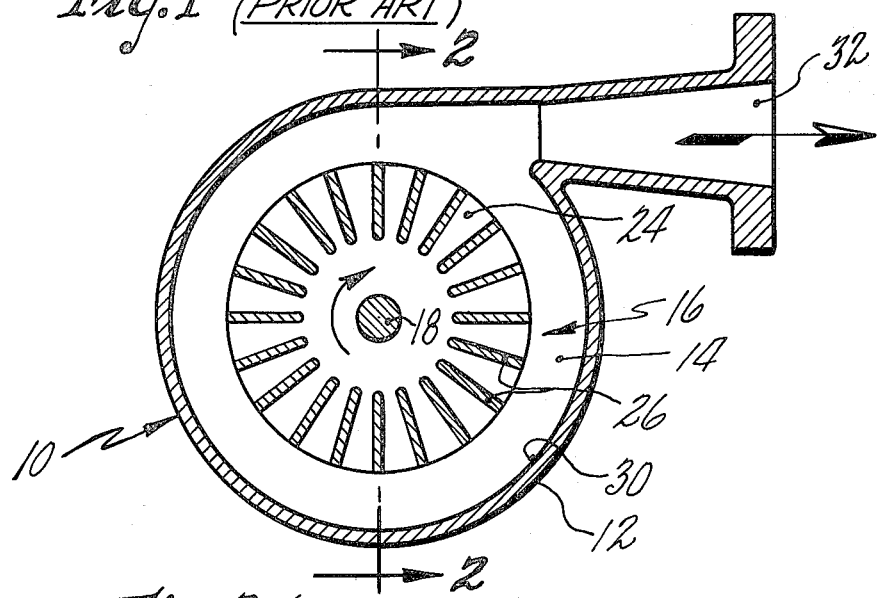
FIG. 1 is a front elevational view of a conventional centrifugal pump.
Figure 2:
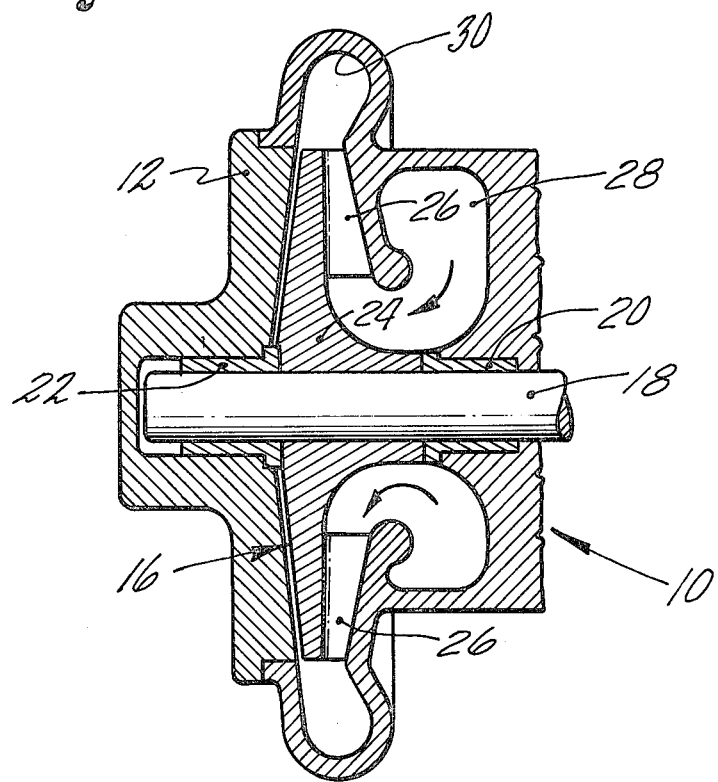
FIG. 2 is a side elevational view of the pump of FIG. 1, taken substantially along the line 2—2 thereof.

Referring to the drawings, wherein like primed numerals are used throughout the several figures to designate like elements, there is shown a conventional centrifugal pump 10 in FIGS. 1 and 2. A housing 12 has a pumping cavity 14 defined therein in which an impeller 16 is mounted for rotation upon a drive shaft 18. The shaft, which is connected to the engine gearbox, is journaled within bearings 20 and 22 which are mounted in the housing 12. The impeller 16 comprises a disc 24 carrying radial blades 26 extending perpendicular to the front surface of the disc 24. Flow from an inlet (not shown) enters a plenum chamber 28 and proceeds thence to the eye of the impeller 16. Flow emerging from the impeller blading enters a collector 30, which comprises part of the pumping cavity, from where it proceeds to a conical diffuse 32 in which fluid velocity is gradually reduced to thereby convert velocity head to pressure head.

Some of the energy imparted to the fluid by impeller 16 is not recovered as useful pump pressure rise, but is instead converted into waste heat. The most significant of these energy losses are impeller windage and recirculation losses. Impeller windage power loss is caused by the frictional drag of the impeller disc on the fluid and is proportional to disc diameter to the 5th power. It is also proportional to the relative rotational speed between the fluid and the disc raised to the 3rd power. Recirculation power loss results when a part of the collector fluid, which has a rotational speed about half the impeller speed, reenters the impeller bladed region near its outer periphery. Shock losses then occur as the fluid encounters the faster moving blades, which impart additional kinetic energy to the fluid and discharge it back into the collector. As the fluid leaves the blading, it encounters additional losses in the vortices and turbulence present at the blade discharge. At low pump through flow, collector fluid may enter and leave the impeller blading several times in this way, increasing the power loss each time. At a given pump speed and flow condition, recirculation power loss is approximately proportional to the bladed outer diameter raised to the 4th power and directly proportional to discharge blade height. Hence, it is clear that to minimize these losses, the impeller diameter must be as small as possible and Impeller discharge blade height must be minimized.

Figure 3:
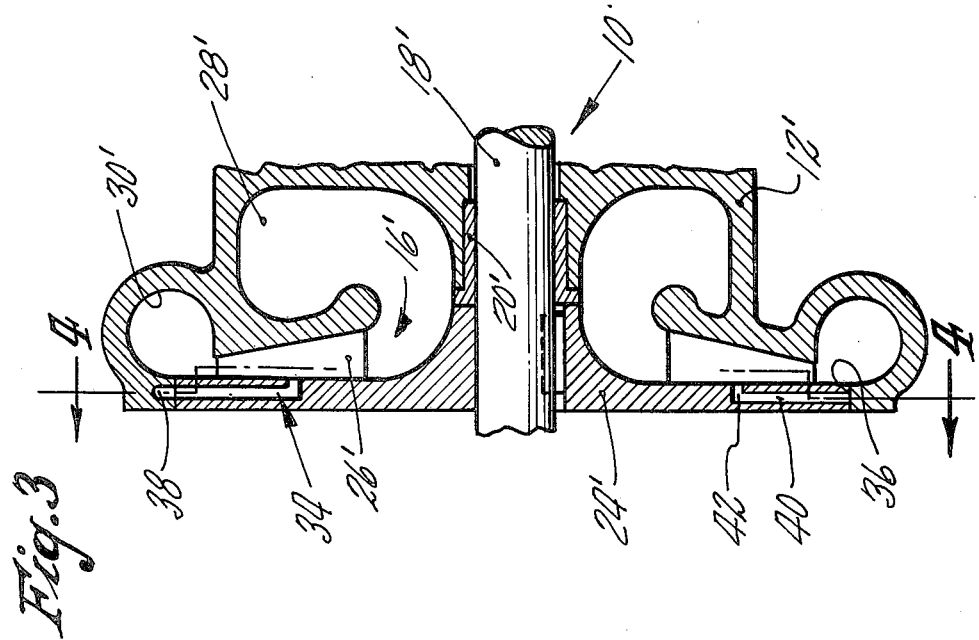
FIG. 3 is a side elevational view of a centrifugal pump of the invention.
Figure 4:
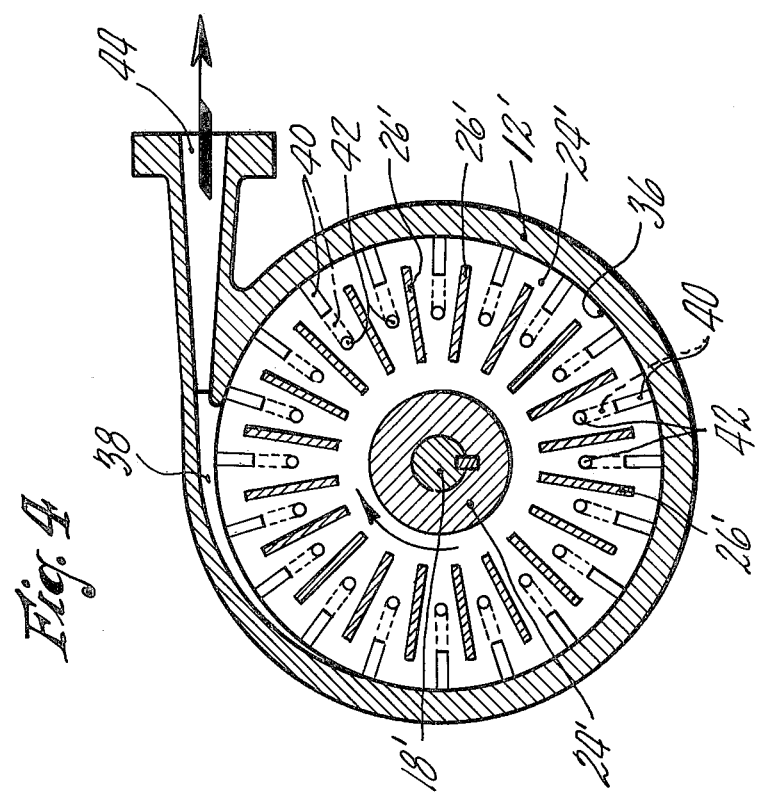
FIG. 4 is a front elevational view of the pump of FIG. 3, taken along the line 4—4 thereof.

Referring to FIGS. 3 and 4, it will be seen that the starting flow impeller elements and the main flow impeller elements are combined in a unitary centrifugal impeller 16' in a unique manner to achieve high efficiency. A disc 24', which is mounted for rotation in the manner of disc 24, carries additional impeller elements, generally designated 34, adjacent to its circumferential periphery for providing starting flow.

The disc 24' has its outer circumferential periphery positioned closely adjacent to an annular wall portion 36 of housing 12'. A starting flow collector 38 is formed in the housing 12' with an entrance in the wall portion 36. It will be seen that the starting flow collector 38 is what is commonly termed a partial emission collector, i.e., a collector which collects fluid from only a few active impeller channels, the remainder of the impeller channels being sealed by the closely spaced wall portion 36. Although other forms of starting flow collectors could be utilized, this type of design would be preferable when low starting flows are required. It will be appreciated that, with such a collector, recirculation power loss is ameliorated because of the close spacing between the circumferential periphery of the disc 24' and the wall portion 36.

The starting flow impeller elements (which simulate blades) are preferably defined by radially extending passages 40 which communicate with the outer circumferential periphery of the disc. The passages may be formed by simply drilling holes in the disc 24' to an intermediate radial location. The inlets to the passages 40 may be formed by drilling transverse inlet holes 42 in the front face of the disc 24' to a depth sufficient to cause the inlet holes 42 to communicate with the passages 40. Starting flow will proceed from adjacent the front face of the disc 24' to the inlet holes 42 and thence to the passage 40. Although the starting impeller elements preferably comprise drilled holes or passages, it will be understood that conventional impeller blading could also be employed providing it was enclosed by a shroud which could be formed by the front and rear faces of the disc 24'.

Fluid from passages 40 enters the collector 38 which extends over only a minor portion of the annular wall 36 and from there proceeds to a diffuser 44 where velocity head is converted to dynamic head. Flow from the diffuser 44 will be at sufficient pressure at engine light-off speed to achieve engine starting.

The main flow impeller elements are constituted by conventional radial blades 26' which extend radially from a location radially inward of the inlet holes 42 to a radial location on the disc 24' adjacent to the inlet to the collector 30', which is partially defined by the front face of the disc 24. Each blade is preferably disposed equidistant from the adjacent inlet holes 42. By locating the inlet holes 42 at intermediate locations in the respective channels defined between the blades, fluid entering the inlet holes 42 is at a pressure sufficiently high to suppress cavitation.

The reduction in power losses derived from this combination of impeller elements results from the starting flow impeller elements 34 being incorporated into a slightly enlarged disc. However, the part of the disc 24', which is inside of the outer periphery of blades 26, would exist even if the starting elements were not included in the design. The windage power losses for this part of disc 24' may then be logically attributed to the main pump only.

Therefore, the addition of a starting impeller incurs no additional windage power losses in this region. The part of the disk 24' external to the outer periphery of blades 26' does incur some additional windage power loss, but this is only a small fraction of the windage power loss that would be produced by a separately mounted starting impeller. This is because the fluid flowing in collector 30', over this outer part of disc 24', has a rotational velocity of at least one-half the speed of disc 24'. Fluid velocity in collector 30' in FIG. 3 is imparted by the main impeller and is approximately the same fluid velocity that would be found in the collector of a separately mounted main impeller, as shown in FIGS. 1 and 2. The normal power loss incurred in holding this velocity in collectors 30 or 30' is therefore associated with the main impeller element only. Because the relative rotational speed between the fluid in collector 30' and the outer part of disc 24' is only one-half the relative speed between a separately mounted starting element disc and its surrrounding fluid (which would have no additional rotational velocity imparted to it by the main impeller element), the starting elements described herein should have less than 12.5% (one-half raised to the 3rd power) of the windage power loss produced by a separately mounted starting flow impeller.

To briefly recapitulate, the pump of FIGS. 3 and 4 employs main flow impeller elements having a discharge radius and blade height adapted to produce the engine maximum rated flow at the maximum required pressure rise and additionally employs starting flow impeller elements with reduced blade height for reduced energy losses and increased diameter for producing the flow and pressure rise required under engine cranking conditions.

Figure 5:
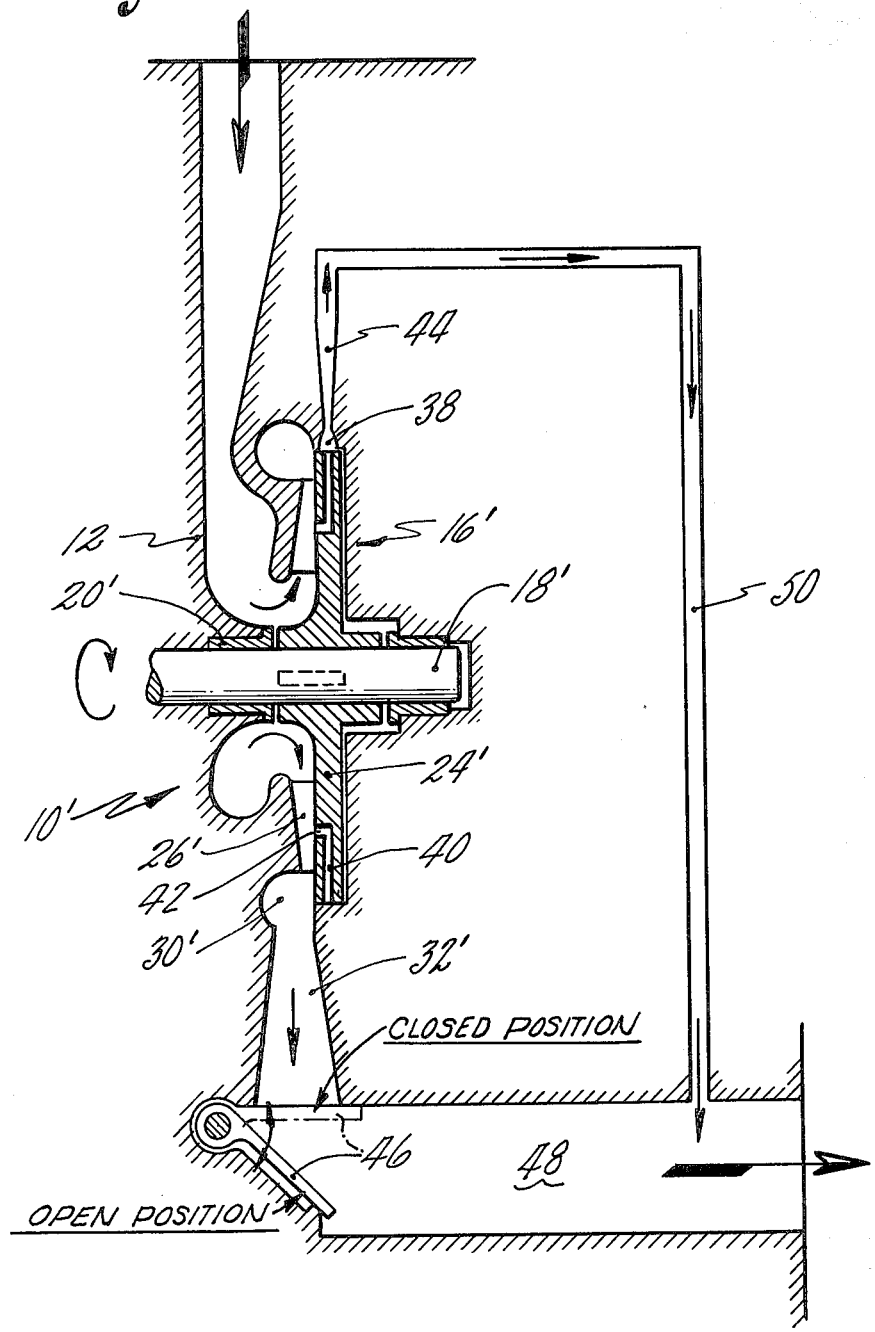
FIG. 5 is a schematic view of an embodiment of a pumping system of the invention incorporating a pump as shown in FIGS. 3 and 4.

FIG. 5 depicts the pump of FIGS. 3 and 4 incorporated in a preferred pumping system. A check valve 46 is interposed between a common discharge conduit 48 and the main flow diffuser 32'. Downstream of the check valve 46, a starting flow discharge conduit 50 joins the common discharge conduit 48. The starting flow discharge conduit 50 communicates with the starting flow diffuser 44 for carrying starting flow to the common discharge conduit 48. The check valve 46, which is shown in its open position, is spring loaded to its closed position wherein the discharge opening of the diffuser 32' is sealed. In the closed position of check valve 46 (shown in phantom lines), starting flow from the conduit 50 is prevented from returning to the impeller 16' via the diffuser 32' and the collector 30' during cranking operation. It will be appreciated that, in the low speed range of engine operation, the pressure at the discharge of the starting flow diffuser 44 is greater than at the discharge of the main flow diffuser 32', thereby maintaining the check valve 46 in its closed or phantom line position.

In operation engine starting flow proceeds to the common discharge conduit 48 from the starting flow diffuser 44 through the conduit 50, return flow to impeller 16' being blocked by the closed check valve 46. As engine speed increases, fuel flow demand correspondingly increases. Increased fuel flow results in greater fluid velocities and consequential pressure losses in the starting flow collector 38 and diffuser 44, thereby reducing fluid pressure in conduits 50 and 48. As a consequence of continued increase in engine flow demand, the pressure in conduit 48 will be exceeded by the pressure upstream of the check valve 46 due to the pressure generated by the main flow impeller elements 26', collector 30' and diffuser 32'. When the pressure differential across the check valve 46 is sufficient to overcome the bias of its spring, the valve 46 will open whereby engine fuel flow will be provided by the main flow impeller elements. Since the main flow impeller elements have a far greater flow capacity than the starting flow impeller elements, further increases in fuel flow will result in a lower magnitude of pressure losses than in the starting elements. Therefore, as fuel flow continues to increase in the normal range of engine operation, substantially all additional flow will be generated by the main flow impeller elements.

With reference to FIG. 6, typical examples of pressure vs. flow curves are presented for the starting flow impeller elements and the main flow impeller elements for a given speed. The dashed lines in the graph reflect the individual performance characteristics of the starting flow impeller elements and the main flow impeller elements, respectively. The solid line shows the combined performance of the impeller elements in conjunction with the valving depicted in FIG. 5. It will be noted that after the rate of fuel flow increases beyond that of point A on the chart, the check valve 46 will open, thereby permitting the main flow impeller elements to provide flow.

In certain applications, it may be necessary or desirable to effect transition from the starting flow impeller elements to the main flow impeller elements at an engine speed below the normal operating range of the main flow impeller elements such that pressure transition will not adversely affect engine fuel control operation. In FIG. 7, a valve, generally indicated at 52, may be interposed in the conduit 50 for controlling flow therethrough. Valve 52 comprises a spool 54 having its uper and lower surfaces referenced to inlet pressure (via a pressure sense line 56) and the pressure in the main flow collector 30' (via a pressure sense line 58), respectively. A spring 60 urges the spool 54 downwardly to a position in which an annular recess 62 on spool 54 allows unrestricted flow in the conduit 50. It should be apparent that, by moving the spool 54 upwardly against the bias of spring 60, the conduit 50 can be closed to further flow from the starting flow diffuser 44.

Should it be desired to occasion a transition from starting flow to main flow at, for example, near 25% of maximum rated speed, the spool areas and the spring preload should be selected such that the forces on the spool are in balance at that particular speed. It will be appreciated that the pressure rise produced by the main flow impeller elements at any given speed is easily determinable. At engine speeds above the selected transition speed, the valve 52 will be maintained in its upper position by the pressure forces acting thereupon, thereby shutting off conduit 50 and preventing starting flow from reaching discharge conduit 48. Upon the closure of the valve 52, the pressure in the discharge conduit will be reduced such that check valve 46 will open and flow from the main flow impeller elements will be allowed to proceed to the engine via conduit 48.

Obviously, many modifications and variations are possible in light of the above teachings without departing from the scope or spirit of the invention as defined in the appended claims. For example, the impeller disc could carry blading on both sides thereof which could supply flow to two main flow collectors. Moreover, the shape of the impeller disc and the geometry and arrangement of the blading for both the starting flow impeller elements and the main flow impeller elements admits of many variations. In addition, the shapes of the collectors could be other than as specifically described.

We claim:

1. A centrifugal pumping system comprising:
   a housing having an inlet, a pumping cavity in fluid communication with the inlet, a starting flow collector and a main flow collector defined therein;
   an impeller disc mounted for rotation within the pumping cavity;
   a plurality of starting flow impeller elements on the disc adapted to discharge flow to the starting flow collector at a radially outer location;
   a plurality of main flow impeller elements on the disc adapted to discharge flow to the main flow collector at a radially inner location;
   a discharge conduit;
   conduit means to direct flow from the starting flow collector and the main flow collector to the discharge conduit; and
   check valve means to prevent flow from the starting flow collector from entering the main flow collector until the pressure generated by the main flow impeller elements exceeds the pressure in the discharge conduit.

2. The centrifugal pumping system of claim 1, further comprising:
   shutoff valve means to shutoff flow from the starting flow collector to the discharge conduit when the impeller disc exceeds a predetermined speed of rotation.

3. The centrifugal pumping system of claim 1, wherein the starting flow impeller elements comprise:
   radially extending passages in the impeller disc adapted to discharge flow at the circumferential periphery thereof and transverse inlet holes in respective communication therewith; and wherein the main flow impeller elements comprise:
   blades extending radially from a location radially inward of the inlet holes to a location adjacent to the inlet of the main flow collector and respectively disposed between adjacent inlet holes.

* * * * *